United States Patent [19]

Muraoka et al.

[11] Patent Number: 5,224,081
[45] Date of Patent: Jun. 29, 1993

[54] SEARCH OPERATION CONTROL APPARATUS IN AN OPTICAL DISC READER

[75] Inventors: Masaru Muraoka; Yutaka Naka; Eiji Miyazaki, all of Daito, Japan

[73] Assignee: Funai Electric Co., Ltd., Osaka, Japan

[21] Appl. No.: 738,109

[22] Filed: Jul. 30, 1991

[30] Foreign Application Priority Data

Apr. 17, 1991 [JP] Japan .............. 3-034682[U]
Apr. 23, 1991 [JP] Japan .............. 3-037881[U]

[51] Int. Cl.$^5$ .............................................. G11B 7/00
[52] U.S. Cl. .............................. 369/32; 369/44.14; 360/78.04
[58] Field of Search ............ 369/32, 44.25, 44.28, 369/33, 44.11, 53-57, 44.12, 44.14, 44.17; 360/78.04, 72.02, 77.01, 77.02, 77.03, 78.06

[56] References Cited

U.S. PATENT DOCUMENTS

| | | | |
|---|---|---|---|
| 4,701,898 | 10/1987 | Giddings | 369/32 |
| 4,774,699 | 9/1988 | Giddings | 369/32 |
| 4,918,676 | 4/1990 | Miyasaka | 369/32 |
| 4,926,405 | 5/1990 | Hangai et al. | 369/32 |

*Primary Examiner*—Robert J. Pascal
*Assistant Examiner*—Ali Neyzari
*Attorney, Agent, or Firm*—Dickstein, Shapiro & Morin

[57] ABSTRACT

A search operation control apparatus in an optical disc reader searches a desired position on an optical disc which is controllably rotated at a constant linear velocity and has its information pits arranged in a segmental spiral, in response to a search command which includes information of the desired position. The apparatus has an optical pickup, an optical-pickup moving controller, and an optical-disc driving controller. The optical-pickup moving controller controllably moves the optical pickup from a current position to a desired position at high speed when it receives a search command. The optical-disc driving controller controllably drives the optical disc during an acceleration/deceleration control timing, and a free-run or constant-run time. During the high-speed translation of the optical pickup, spindle servocontrol to the optical disc is not executed, but the acceleration/deceleration control process and the free-run or constant-run control process are executed. The acceleration/deceleration control process is carried out during the interval which is required to change the rotation speed of the optical disc from that of the current position of the optical pickup to that of the desired position. After the acceleration/deceleration control process, the free-run or constant-run control process is carried out during the interval which is calculated by substracting the acceleration/deceleration control timing from the total translation time of the optical pickup.

16 Claims, 12 Drawing Sheets

F I G. 14
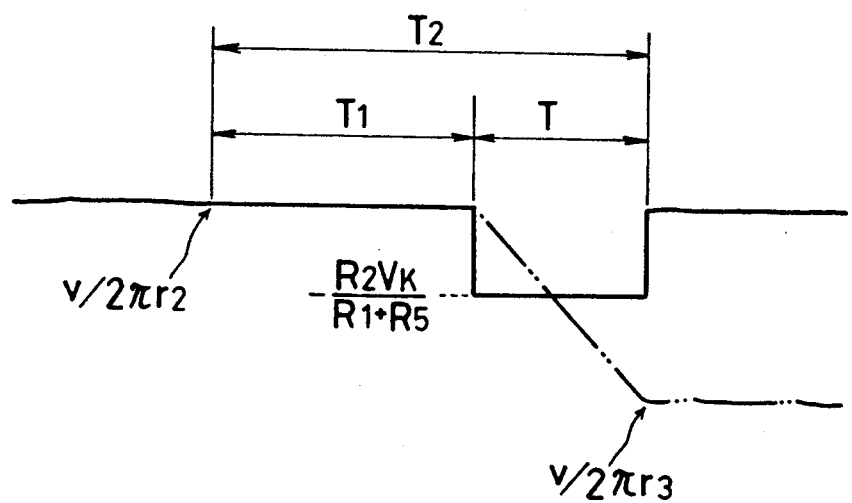

SEARCH OPERATION CONTROL APPARATUS IN AN OPTICAL DISC READER

BACKGROUND OF THE INVENTION

The present invention relates to a search operation control apparatus in an optical disc reader. More specifically, it relates to an apparatus for search operation control in an optical disc reader which reads an optical disc, such as a compact disc or a laser disc, under constant linear velocity (CLV) control, for example, modified constant linear velocity (MCLV) control.

The compact disc (CD), a type of optical disc, has become very popular and has superseded the LP record in the field of audio reproduction systems.

An optical disc is usually driven at either a constant angular velocity (CAV) or at a constant linear velocity (CLV). In a CD system using CLV control, the speed of the disc is changed in correspondence with the position of an optical pickup along the disc, or with the radius of a track read by the pickup.

In conjunction with the more widespread used CDs, the CD as a read-only memory (CD-ROM) has come into standardization. The CD-ROM is a 12 cm-diameter CD for storing data and programs, from which a computer can read the information stored.

The CD-ROM has a large memory capacity and provides high-speed access and search capabilities. For example, a CD-ROM can store data of $7.83 \times 10^8$ bytes, or as much as the total memory capacity of about one hundred to three hundred floppy discs of 3.5 inches. The access time for searching and reading desired data is about 0.7 seconds on average, which is about one hundred times as fast as the access time of a 10-inch magnetic tape having almost the same data storage capacity. The access time is defined therein as the sum of the seek time, in which the optical pickup is seeking a desired track, and the wait time, in which the optical pickup is awaiting the desired data on the track.

As mentioned in the foregoing, CD-ROM access time is less than that for a magnetic tape, yet it is not sufficiently less by comparison with that of other magnetic storage mediums, such as hard discs. The hard disc, for example, has an average access time of slightly more than 10 msec, which is roughly one-tenth that of a CD-ROM. Accordingly, it is desirable to shorten the access time for the CD-ROM. Shortening the access time is also desirable for CD-Interactive devices, and CD devices (for example, 6.5-cm CD device) which can be rewritten for one or more times. Furthermore, it is also desirable for optical (or optical-magnetic) disc readers or players which are loaded with a 30-cm or 20-cm CD which can be rewritten for one or more times.

The information stored in an optical disc such as a CD is read by the optical pickup. The CD has tracks comprising pits arranged in a segmental spiral. The optical pickup generates a spotting beam radiating therefrom onto the tracks of the CD and detects its reflection to thus apply output signals to a signal processor which follows.

In ordinary reading operation, an optical disc reader drives the optical pickup in the radial direction along a disc at low speed in order to permit the spotting beam to scan the spiral tracks on the CD. At the same time, a spindle motor drives the disc and is servocontrolled by synchronizing signals derived from the disc in order to maintain the linear velocity of the disc at a constant value. That is, the rotation speed of the disc is varied in proportion to the position of the optical pickup in the radial direction, or to the position of the track to be read.

When the CD reader performs a searching operation, the optical pickup is first moved at high speed in the radial direction. During the movement, the reader counts the number of tracks which the optical pickup crosses, and then it controllably moves the optical pickup in accordance with the counted number of and the information obtained from the tracks. In order to achieve the rotation speed which corresponds to a desired track position, the disc is either accelerated or decelerated, depending upon the synchronizing signals detected by the optical pickup. The disc thus can approximately attains the rotation speed which corresponds to the desired track position. Following the controllable movement of the optical pickup, the spindle to the disc is servocontrolled such that the disc achieves the rotational speed accurate for the desired track position.

To obtain constantly correct synchronizing signals from the tracks during a search operation is, however, difficult, due to the high speed at which the optical pickup crosses the tracks. This makes servocontrol of the spindle motor inexact and protracts the time for access via the optical pickup. While it may be possible to eliminate irregular portions of the synchronizing signals electronically in order to solve the problem, this method cannot eliminate all such irregularities.

Furthermore, accurately counting the number of tracks scanned during a search in order to reduce the access time may prove impossible due to count failure. Because CD tracks consist of pits arranged in a segmental spiral, as described in the above, count failure arises when the optical pickup crosses a track at a place where no pits exist.

Tracks fail to be counted particularly during a search from the inner portion towards the outer portion of a disc. That is, when the search is performed from the inner portion toward the outer portion, the disc rotates at low linear velocity as it is decelerated. Under these circumstances, a large transverse angle is formed against a crossed track by the spotting beam locus, thus the spotting beam of the pickup crosses a lesser number of pits, such that the reader may fail to count tracks. Failure to count tracks results in an increased seek time for arrival at the desired track, thereby protracting the access time.

SUMMARY OF THE INVENTION

It is an object of the present invention to provide a search operation control apparatus which during a search operation employs a stable-control spindle servomechanism in an optical disc reader in order to decrease the search time.

It is another object of the present invention to provide a search operation control apparatus in an optical disc reader in which failure to count tracks during a search from the inner portion to the outer portion along the disc is minimized in order to decrease access time.

A search operation control apparatus in an optical disc reader according to an aspect of the present invention searches a desired position on an optical disc in response to a search command which includes information on the desired position. The disc is controllably rotated at a constant linear velocity and incorporates information pits arranged in a segmental spiral. This apparatus includes an optical pickup, a movement controller, and means for controllably driving the optical disc.

The optical pickup is movable in the radial direction along the optical disc in order to scan the information pits. The movement controller controllably drives the optical pickup to move from the current position to a desired position when the controller receives a search command. The optical-disc drive controller controllably drives the optical disc at a rotating speed corresponding to the desired position by means of an acceleration/deceleration control and a free-run control, while the movement controller controllably moves the optical pickup.

During reading of the optical disc, the disc is servo-controlled to rotate at a constant linear velocity, and the optical pickup is moved in the radial direction at a low speed in order to scan the information pits, i.e. the segments along the spiral track, whereby the information stored in the track is read.

When the search command is given, the optical pickup is moved at high speed from the current track to the desired track. During the high speed movement of the optical pickup, the spindle to the optical disc is not servocontrolled, but the acceleration/deceleration control and the free-run control are performed. The acceleration/deceleration control is performed during an interval which is determined by the difference between the rotation numbers of the optical disc at the current position and at the desired position; and the free-run control is performed during an interval which is calculated by subtracting the interval of the acceleration/deceleration control from that of the optical pickup movement.

Thus, servocontrol, which can become instable and so increase access time, is not employed during the searching operation which thereby reduces the access time.

A search operation control apparatus in an optical disc reader according to another aspect of the present invention searches a desired position on an optical disc in response to a search command which includes information on the desired position. The disc is controllably rotated at a constant linear velocity and incorporates information pits arranged in a segmental spiral. This apparatus includes an optical pickup, a movement controller, and a means for controllably driving the optical disc.

The optical pickup and the movement controller are the same as those in the above apparatus according to the former aspect of the present invention. The optical-disc drive controller controllably drives the optical disc to have a rotating speed corresponding to the desired position by means of an acceleration/deceleration control, and by a constant-run control which maintains the rotation of the optical disc at speed in spite of rotational resistance, which tends to decrease the rotation speed in the interval when the movement controller controllably moves the optical pickup.

The apparatus maintaining the rotation speed of the optical disc by applying a small voltage such that the rotation speed is not decreased despite the rotational resistance. Consequently, while the optical pickup moves, the rotation of the optical disc is maintained at the speed corresponding to the desired position. Thereupon the servocontrol quickly effects the precise rotation speed.

A search operation control apparatus is an optical disc reader according to another aspect of the present invention searches a desired position on an optical disc in response to a search command which includes information on the desired position. The disc is controllably rotated at a constant linear velocity and incorporates information pits arranged in a segmental spiral. This apparatus includes an optical pickup, a movement controller, and a means for controllably driving the optical disc.

The optical-disc drive controller controllably drives the optical disc to start decelerating just before the optical pickup arrives at the desired position, in response to a search command to search in the outward direction along the disc.

The optical disc is controllably driven so as to maintain constant linear velocity when it is read by the apparatus. When the movement controller moves the optical pickup in the outward direction, specifically, along the optical disc, the optical-disc drive controller decelerates the disc just before the optical pickup arrives at the desired position.

Consequently, the optical disc is searched at high speed rotation for an extended period, whereby the traversing angle formed by the spotting beam locus from the optical pickup against the tracks of the optical disc is minimized for the extended time. Therefore, the spotting beam crosses more information pits than in the conventional manner, and fails to count fewer tracks. Since the number of tracks may thus be correctly counted, the seek time or access time is reduced.

These and other objects and advantages of the present invention will be more fully apparent from the following detailed description.

BRIEF DESCRIPTION OF THE DRAWINGS

FIG. 14 is a timing graph of embodiment 3 in deceleration; and

DESCRIPTION OF THE PREFERRED EMBODIMENT

Embodiment 1

Figure 1:
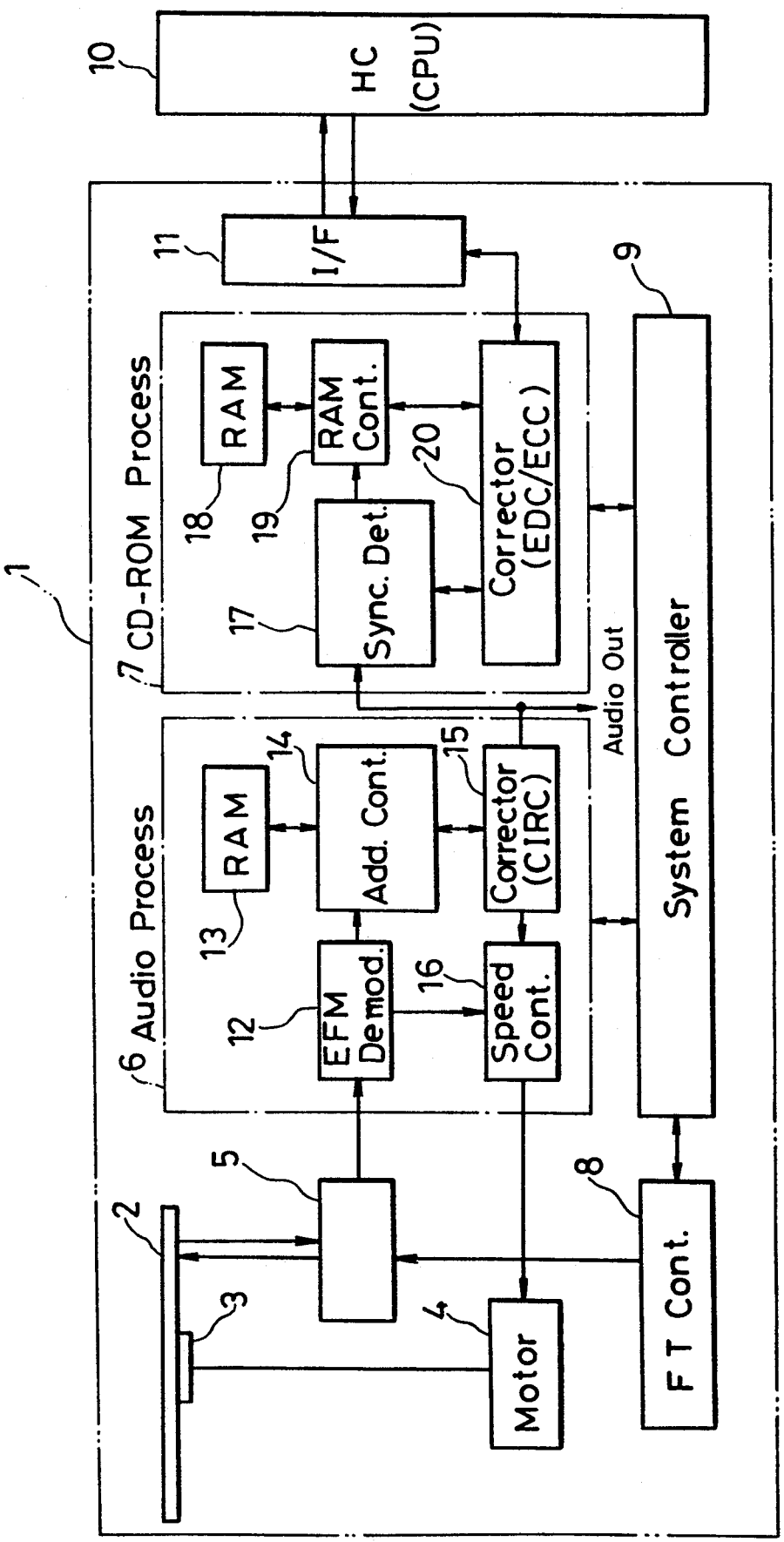
FIG. 1 is a block diagram showing a CD-ROM drive which includes a search operation control apparatus as in embodiment 1 according to the present invention.

Referring to FIG. 1, a CD-ROM drive 1 (hereinafter referred to as the drive 1) includes a control search operation apparatus according to the present invention.

The drive 1 principally includes a disc retainer 3 for retaining a disc 2; a spindle motor 4 for rotating the disc 2; an optical pickup 5 for reading information from the disc 2; an audio digital signal processor 6; a CD-ROM digital signal processor 7; a focusing/tracking controller 8, which controls the focus and tracking of the optical pickup 5; a system controller 9 including a microcomputer; and an interface 11 for communicating with a host computer 10.

Figure 3:
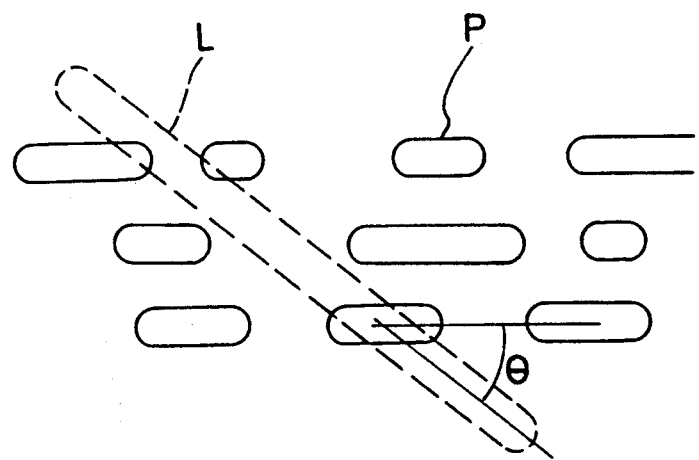
FIG. 3 is a diagram depicting pits constituting tracks, traversed by the spotting-beam locus during a search.

The disc 2 has information pits P, as shown in FIG. 3, which are arranged in a segmental spiral line. The spindle motor 4 is capable of rotating the disc 2 at a constant linear velocity in correspondence with control signals from the audio digital signal processor 6. The optical pickup 5 irradiates the disc 2 with a spotting beam and reads the information on the disc 2 by detecting the reflected light. The optical pickup 5 is able to move in the radial direction along the disc 2. The optical pickup 5 has an objective lens (not shown) for focusing its spotting beam by movement both in the radial direction along the disc 2, and in the direction of the disc's thickness. The focusing/tracking controller 8 directs the tracking and the focus of the optical pickup 5.

The audio digital signal processor 6 includes an eight-to-fourteen modulation (EFM) demodulator 12 which receives signals from the optical pickup 3; a RAM 13 for storing data; an address controller 14 which controls reading from and writing to the RAM 13; a corrector 15 for correcting by means of a Cross Interleaved Reed-Solomon Code (CIRC); and a speed controller 16 for controlling the speed of the spindle motor 4. The EFM demodulator 12 demodulates the data in eight-to-fourteen modulation stored in the disc 2. The speed controller 16 by means of derived synchronizing signals outputs drive signals for controlling the speed of the spindle motor 4. The speed controller 16 so controls the spindle motor 4 that the disc 2 has a constant linear velocity during data retrieval, and achieves the linear velocity corresponding to a desired track by acceleration or deceleration. The address controller 14 de-interleaves the interleaved data stored in the RAM 13. The output of the corrector 15 is applied to the CD-ROM digital signal processor 7. The output may alternatively be delivered to the exterior in the form of audio signals.

The CD-ROM digital signal processor 7 includes a synchronization detector 17; a RAM 18 for storing data; a RAM controller 19 which controls writing to and reading from the RAM 18; and a corrector 20 for correcting signals by means of error check codes (ECC), error detecting codes (EDC), etc., specifically for application to a CD-ROM. The synchronization detector 17 detects synchronization signals in the data which have been processed by the audio digital signal processor 6. The synchronization detector 17, upon detecting the synchronization signals, descrambles the data which have been scrambled. The RAM controller 19 compares header addresses in the reproduced data with the data stored in the RAM 18.

Figure 2:
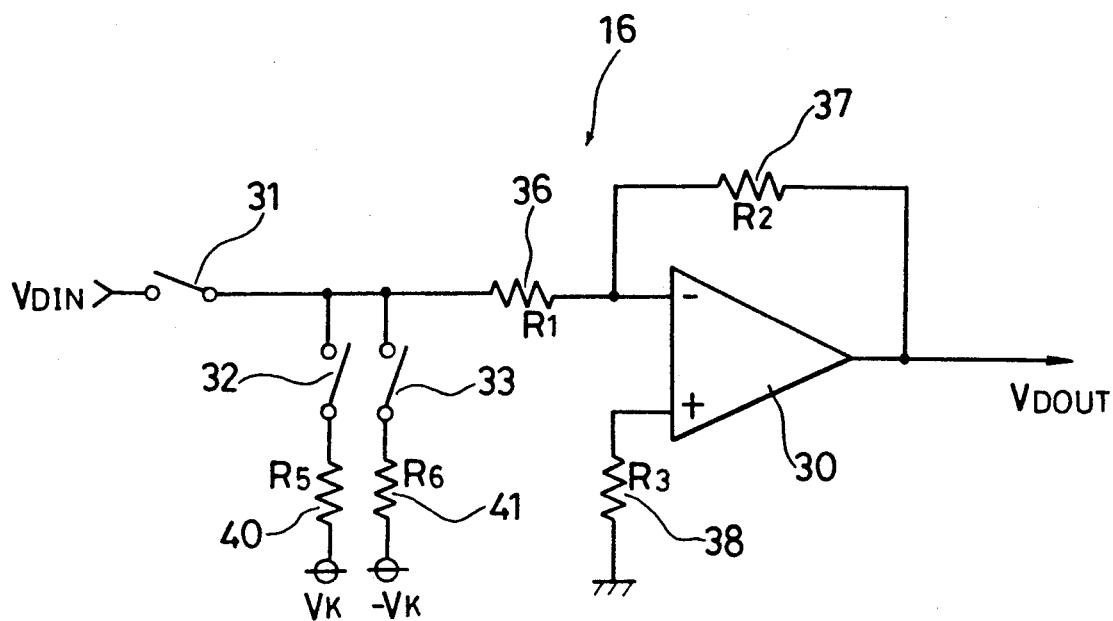
FIG. 2 is a circuit diagram showing a speed controller.

FIG. 2 shows the main part of the speed controller 16 which includes an operational amplifier 30. Drive signals $V_{DIN}$ for driving the spindle motor 4 are inputted to the inverting input terminal of the operational amplifier 30 through a switch 31 and a resistor 36 of resistance $R_1$. One of the two nodes between the switch 31 and the resistor 36 is connected to a series circuit consisting of a switch 32 and a resistor 40 of resistance $R_5$, and the other node is connected to second series circuit consisting of a switch 33 and a resistor 41 of resistance $R_6$. One end of the resistor 40 is connected to a power source of voltage $V_K$, and one end of the resistor 41 is connected to another power source of voltage $-V_K$. The noninverting input terminal of the operational amplifier 30 is connected to one end of a resistor 38 of resistance $R_3$ the other end of which is grounded. The output terminal of the operational amplifier 30 is connected to the inverting input terminal through a resistor 37 of resistance $R_2$, forming a feedback circuit. The output of the operational amplifier 30 is applied as drive signals $V_{DOUT}$ to the spindle motor 4 (FIG. 1).

In this circuit, switch 31 is open during a search so that the spindle motor 4 is not servocontrolled. In order to accelerate the disc 2 during a search, switch 32 is opened and switch 33 is closed, whereas in order to decelerate the disc 2 during a search, switch 32 is closed and switch 33 is opened. During data retrieval, switch 31 is closed, and switches 32 and 33 are opened.

Figure 4:
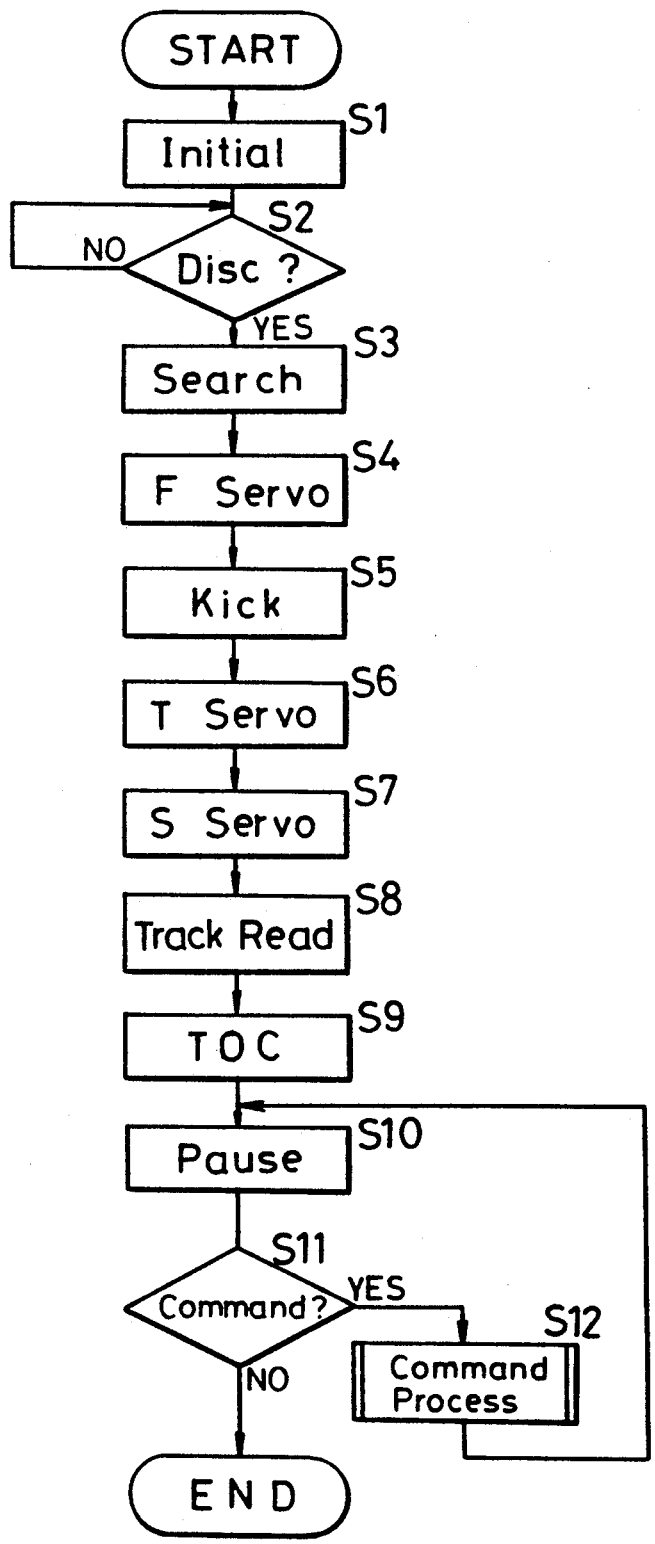
FIG. 4 is a flow chart showing the control process of a system controller.

Referring to FIG. 4, which shows a brief flow chart of the control process of the system controller 9, control in the drive 1, structured as thus in the above, will be described.

When a power source switch (not-shown) is closed, an initialization process is carried out which includes initialization of the RAMs 13 and 18 and setting of the optical pickup 5 into the initial position. At step S2, it is decided if the disc 2 is loaded on the disc retainer 3. If the disc 2 is loaded, step S3 is then executed. At step S3, the focusing/tracking controller 8 is commanded to perform a focus search, wherein the spotting beam with which the optical pickup 5 irradiates the disc 2 is focused into a predetermined diameter. After the focus search, the focusing/tracking controller 8 is commanded to start the focus servocontrol at step S4. During the focus servocontrol, the object lens of the optical pickup 5 is controllably driven to compensate for deviations on the surface of the disc 2.

At step S5, the speed controller 16 is commanded to start a spindle-kick control process, wherein the speed controller 16 sends drive signals to the spindle motor 4 to start rotation. At step S6, the focusing/tracking controller 8 is commanded to start the tracking servocontrol. Servocontrol of the tracking functions to controllably move the objective lens of the optical pickup 5 in the radial direction along the disc 2 in order to make the spotting beams trace a track on the disc 2. At step S7, the speed controller 16 is commanded to start servocontrol of the spindle, wherein the spindle motor 4 is controllably rotated at a speed corresponding to the position of the optical pickup 5 relative to the radial direction, to maintain the disc 2 at a constant linear velocity.

After starting the spindle servocontrol at step S7, step S8 is executed, at which information from the current track, which is written at the head of each block of the tracks on the disc 2, is read. At step S9, the table of contents (TOC) of the disc 2, which is written on the innermost portion of the disc, is searched and read, and then the information is stored in a memory in the system controller 9.

At step S10, a pause of a predetermined period is executed, and then at step S11 the drive 1 waits for a command from the host computer 10. When a command from the host computer 10 is received, step S12 is executed, upon which the command process described below is carried out, and after which the program returns to step S10. In case no command is inputted at step S11, the program ends.

Figure 5:
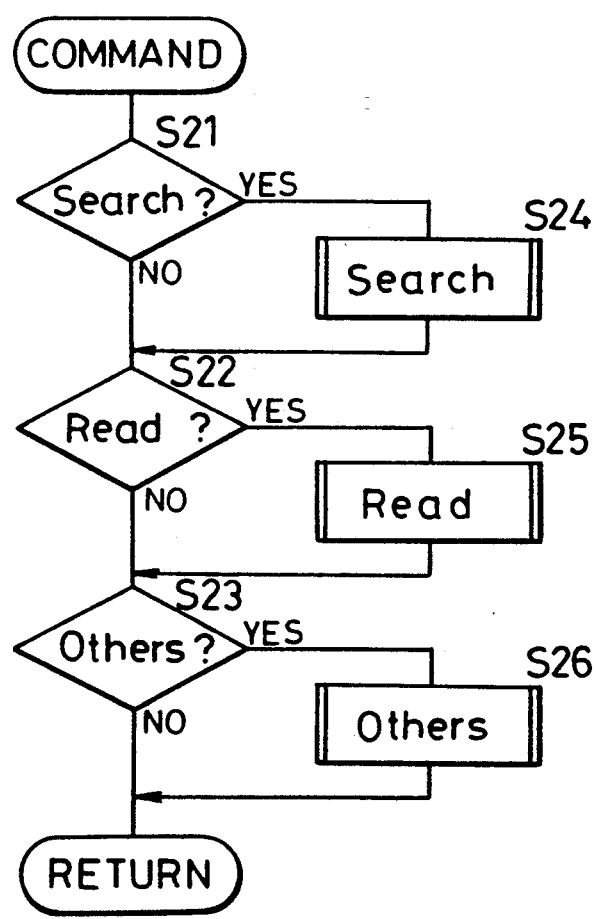
FIG. 5 is a flow chart showing a command process.

FIG. 5 is a flow chart showing the command process at step S12. At step S21, it is determined whether the command from the host computer 10 is a command to start a search operation. The at step S22, it is determined whether the command is a command to start a data reading operation. At step S23, it is determined whether the command is a command to start other operations.

When the command is to start a search operation, the program runs from step S21 to step S24 so as to perform the search operation. Then the program goes on to step S22. When the command is to start a data reading operation, the program runs from step S22 to step S25 so as to perform the data reading operation. Then the program goes on to step S23. When the command is to start other operations, the program runs from step S23 to step S26 so as to start those operations. Then the program goes back to the main routine.

Figure 6:
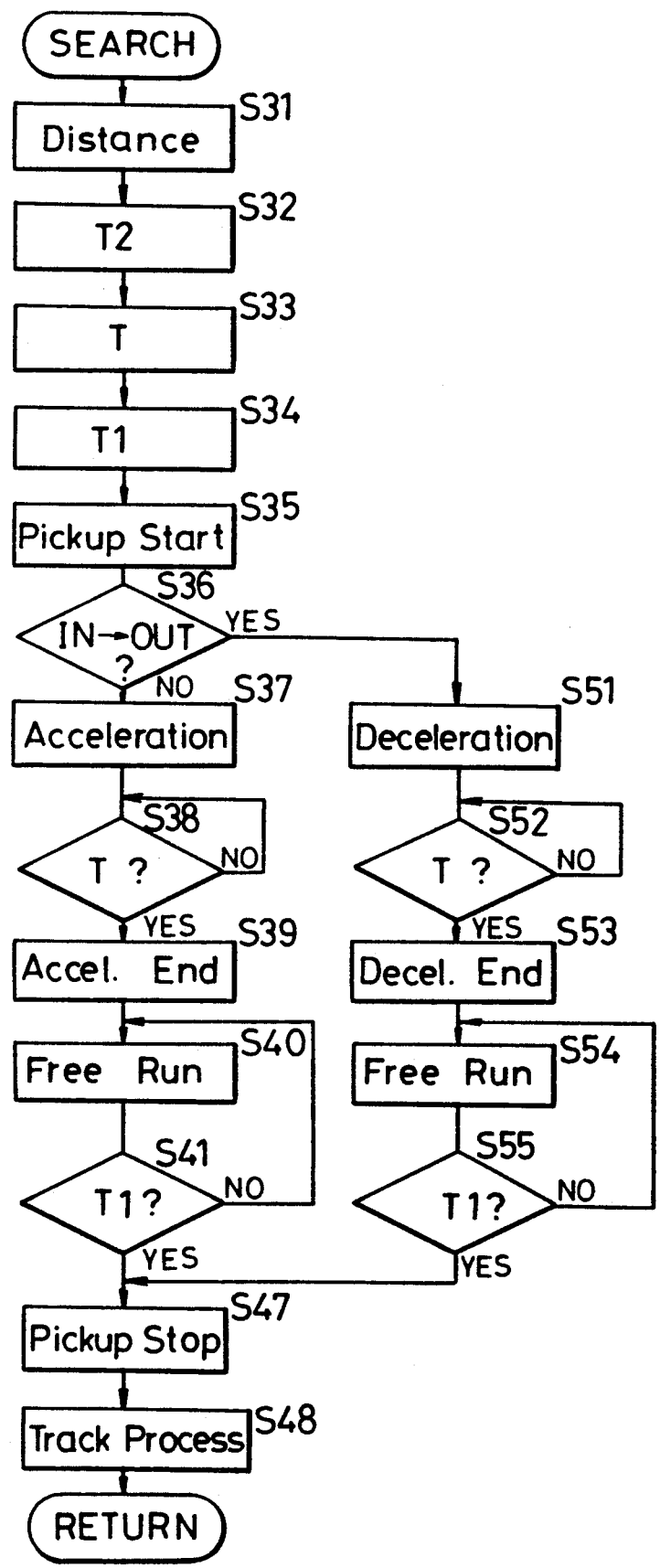
FIG. 6 is a flow chart showing a search process according to embodiment 1.

FIG. 6 is a flow chart showing the search operation at step S24. At step S31, the location on the disc 2 where a desired track exists is obtained by using information in the memory of the system controller 9 which stores the TOC, then the distance over which the optical pickup 5 must be translated from the present track to the desired track is calculated.

The calculation of the translation distance will be described in the following:

Since each track of the disc 2 has its address defined in terms of elapsed-time intervals in tracking from the innermost track, the following equation is provided.

$$\pi \times r_2^2 - \pi \times r_1^2 = v \times 0.0016 \times P$$

where
  $r_1$: radius of the innermost track
  $r_2$: radius of a current track
  v: linear velocity (mm/sec) for storing data in the disc
  0.0016: track pitch
  P: MP×60+SP+TP/75
    (where MP is the minutes, SP is the seconds, and TP is track number in the address of the current track)
Accordingly, $$r_2 = [(v \times 0.0016 \times P + \pi \times r_1^2)/\pi]^{\frac{1}{2}}$$

and $$r_3 = [(v \times 0.0016 \times Q + \pi \times r_1^2)/\pi]^{\frac{1}{2}}$$

where
  Q: MQ×60+SQ+TQ/75

$r_3$: radius of a desired track
    (where MQ is the minutes, SQ is the seconds, and TQ is track number in the address of the desired track)
The distance $\Delta r$ is calculated by the following formula from the radius $r_2$ of the current track and the radius $r_3$ of the desired track.

$$\Delta r = |r_3 - r_2|$$

Then at step S32, moving time $T_2$ for the optical pickup 5 is calculated. The moving time $T_2$ is obtained by dividing the distance $\Delta r$ calculated at step S31 by the translation speed of the optical pickup 5. At step S33, a kick-in time T is calculated. The kick-in time T is the interval of time during which the spindle motor 4 is accelerated or decelerated, that is, the interval during which either switch 32 or 33 of the speed controller 16 in FIG. 2 is closed.

Given that $v/2\pi r_2$ is the rotation number of the disc 2 when the optical pickup 5 is positioned at a current track of radius $r_2$, and that $v/2\pi r_3$ is the rotation number of the disc 2 when the optical pickup 5 is positioned at a desired track of radius $r_3$, the kick-in time T is calculated by the following manner:

$$\Delta N = |(v/2\pi) \times (1/r_2 - 1/r_3)|$$

where $\Delta N$ is the difference of the rotation numbers.

The kick-in time is determined so as to satisfy
$\omega T = \Delta N$
where $\omega$ is the acceleration of the kicked disc 2. Accordingly, the kick-in time T is calculated by $$T = \Delta N / \omega$$

The acceleration $\omega$ is a constant fixed according to specification in the drive 1.

After calculating the kick-in time T, free-run time $T_1$ is calculated at step S34. The free-run time $T_1$ is obtained by subtracting the kick-in time T from the moving time $T_2$.

At step S35, the focusing/tracking controller 8 is commanded to start moving the optical pickup 5. At step S36, it is determined if the movement is directed in the inward direction or the outward direction. When the movement is directed in the inward direction, the program runs to step S37. At step S37, switch 31 is opened, stopping spindle servocontrol, and switches 32 and 33 are closed. When the switches are thus set, the following voltage $V_{DOUT}$ is applied to the spindle motor 4 in order to accelerate it.

$$V_{DOUT} = [R_2/(R_1 + R_6)] \times V_K$$

Then at step S38, it is determined if time T has elapsed. Following the elapse of time T, at step S39, switch 33 is opened terminating acceleration of the disc 2.

At step S40, a free-run control process is carried out. In the free-run process, switches 31, 32 and 33 in the speed controller 16 are all opened so that no voltage is applied to the spindle motor 4. Next, at step S41, it is determined if the free-run process has been performed for the duration of time $T_1$. After the time $T_1$ has elapsed, step S47 is then executed. At step S47, the optical pickup 5 is halted.

Then at step S48, a tracking process is carried out in which switch 31 in the speed controller 16 is closed, starting servocontrol of the spindle. The following voltage $V_{DOUT}$ is thus applied to the spindle motor 4.

$$V_{DOUT} = -(R_2/R_1)V_{DIN}$$

Moreover, the track information is read by the optical pickup 5, and it is determined whether the pickup has arrived at a desired track. The above method completes the positioning of the optical pickup 5 to the desired track.

As described in the foregoing, the optical disc 2 is directed to free-run for time $T_1$ following the kick-in time T, thus avoiding the instabilities of servocontrol that arise in conventional apparatus. Rather rapid, accurate control of the rotation speed of the optical disc 2 is executed immediately after completion of the movement of the optical pickup 5. Hence the access time is reduced.

When it is determined at step S36 that the optical pickup 5 moves in the outward direction, step S51 is executed. At step S51, switch 31 is opened to stopping servocontrol of the spindle, and switches 32 and 33 are closed. As a result of this switching process, the following voltage $V_{DOUT}$ is applied to the spindle motor 4, in order to decelerate it.

$$V_{DOUT} = -[R_2/(R_1+R_5)] \times V_K$$

At step S52, it is determined if time T has elapsed. Following the passage of time T, switch 32 is opened at step S53, so that the deceleration of the disc 2 is halted. Subsequently, at steps S54 and S55, as well as at steps S40 and S41, a free-run process is executed, then step S47 is executed following the duration through time $T_1$ of the free-run process.

Figure 7:
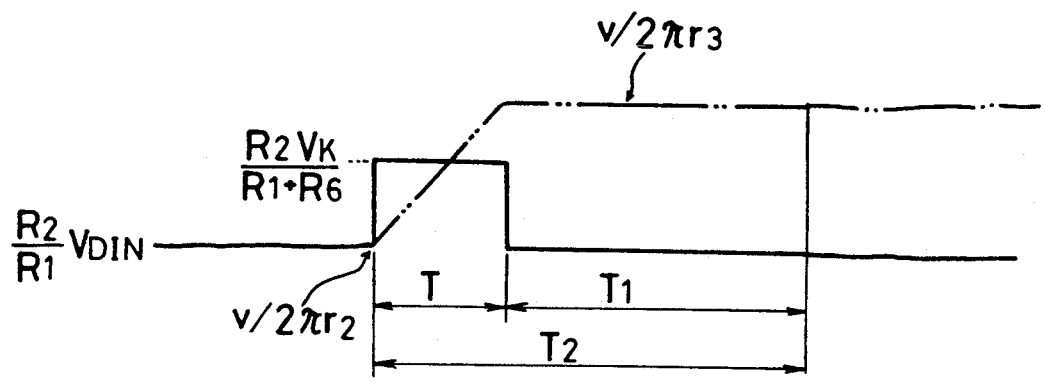
FIG. 7 is a timing graph of embodiment 1 in acceleration.
Figure 8:
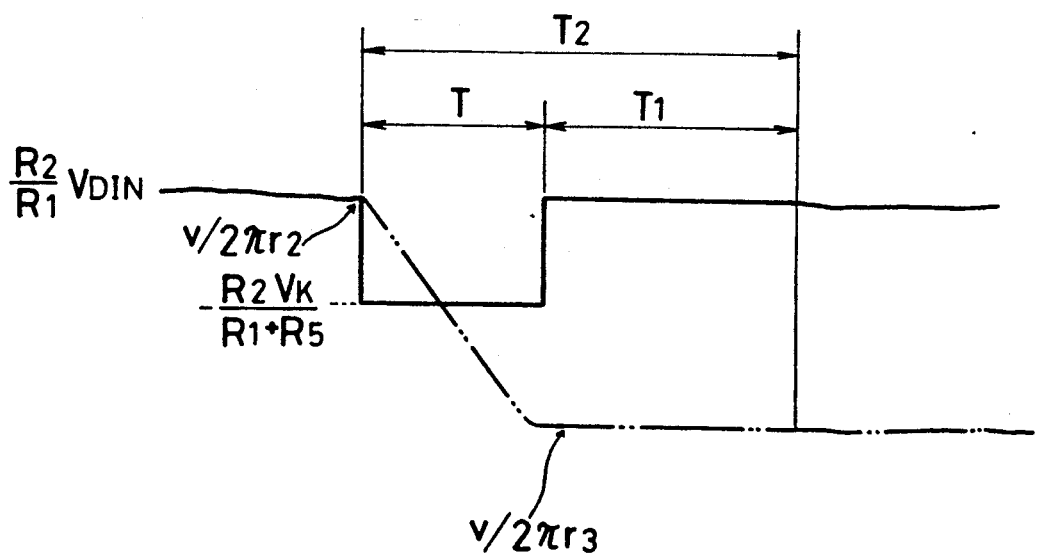
FIG. 8 is a timing graph of embodiment 1 in deceleration.

FIG. 7 is a timing graph showing the kick-in time during acceleration, and FIG. 8 is another timing graph showing the kick-in time during deceleration. As shown in FIG. 7, the free-run process is continued through time $T_1$, following acceleration during time T. Accordingly, the rotation speed, as indicated by a double-dotted broken line, is increased from $v/2\pi r_2$ to $v/2\pi r_3$. As shown in FIG. 8, the free-run control starts following deceleration during time T. The rotation speed, as indicated by the double-dotted broken line, is decelerated from $v/2\pi r_2$ to $v/2\pi r_3$.

Embodiment 2

This embodiment incorporates a means by which a small voltage is applied during a period of time $T_1$ to prevent decrease in the velocity of the disc 2 due to rotational resistance, as distinguished from the free-run control process employed during time $T_1$ in the above embodiment.

Figure 9:
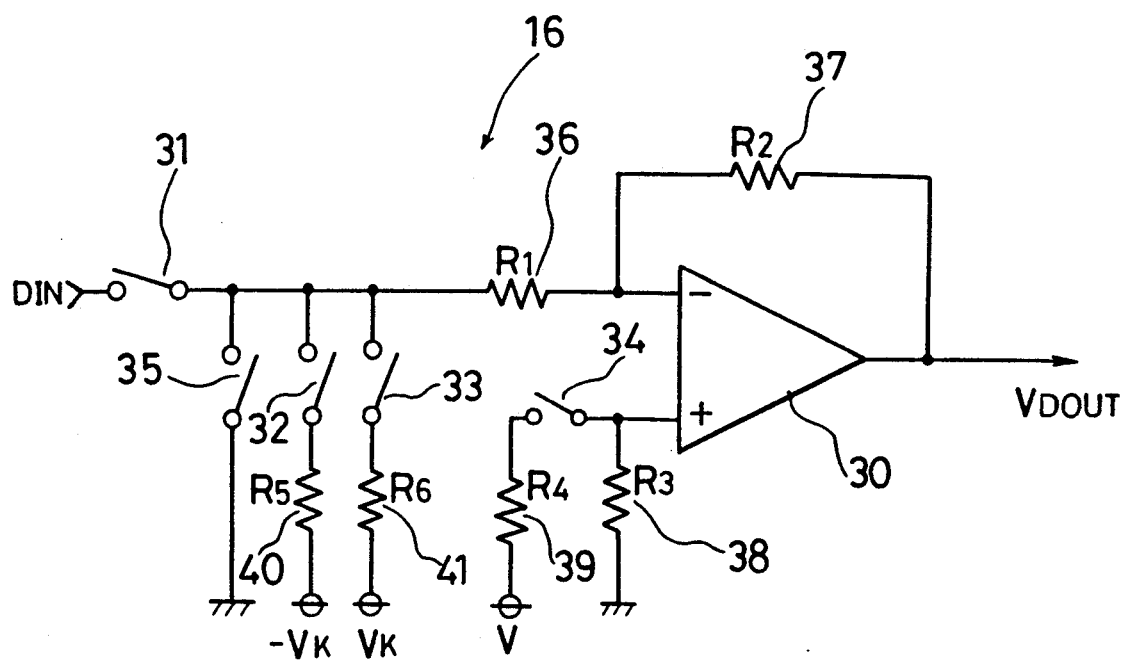
FIG. 9 is a circuit diagram showing the main part of a speed controller of a CD-ROM drive as in embodiment 2 according to the present invention.

FIG. 9 shows the main part of the speed controller 16 according to embodiment 2. This embodiment includes a switch 35, a resistor 38 of resistance $R_3$ which grounds the noninverting input terminal of the amplifier 30, and a switch 34 and a resistor 39 of resistance $R_4$ which connects the noninverting input terminal of the amplifier 30 to the power source V, as additions to the circuit shown in FIG. 2. Embodiment 2 also includes other components which are the same as those in embodiment 1.

The operation of drive 1 of the present embodiment will now be described. The control method and command processes in the control operation of the embodiment are in general similar to those shown in FIGS. 4 and 5.

Figure 10:
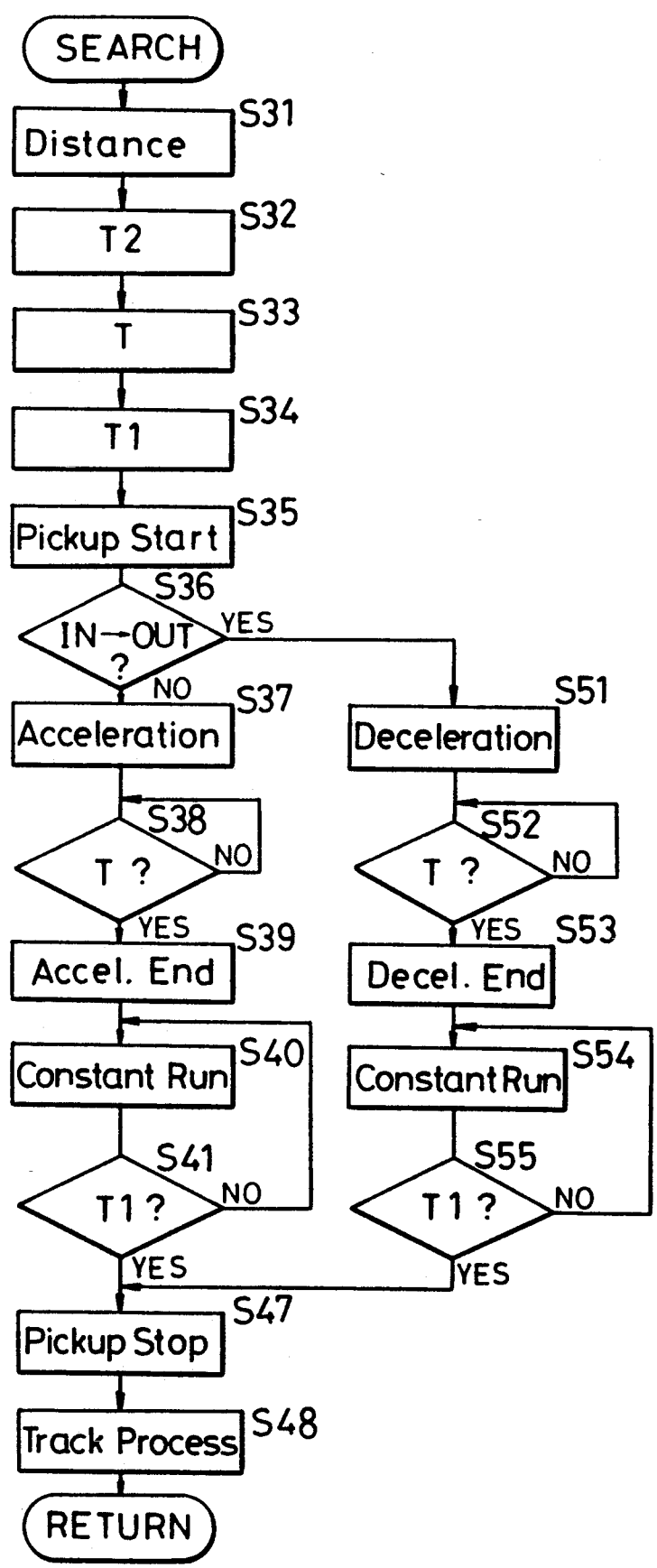
FIG. 10 is a flow chart showing a search process according to embodiment 2.

FIG. 10 is a flow chart showing a search process according to embodiment 2. In comparison with the search process according to embodiment 1, embodiment 2 has different processes at steps S40 and S54, while the remaining processes are the same. Instead of free-run control, constant-run control is carried out at steps S40 and S54 in embodiment 2. That is, switches 32 and 33 of FIG. 9 are opened at steps S39 or S53, halting acceleration or deceleration, then switches 34 and 35 are closed and switch 31 is opened. The presently described condition can be represented by the following formula for calculating the output voltage $V_{DOUT}$ corresponding to the rotational resistance. The voltage $V_{DOUT}$ is applied to the spindle motor 4, so that the spindle motor 4 rotates at a constant speed against the rotational resistance.

$$V_{DOUT} = [(R_1+R_2)/R_1] \times [R_3/(R_3+R_4)] \times V$$

Thus, the rotation of the disc 2 is maintained at the rotation speed which corresponds to the position on the desired track. The rotation speed is maintained throughout time $T_1$. Subsequently, processes which are the same as those shown in FIG. 6 are executed.

Figure 11:
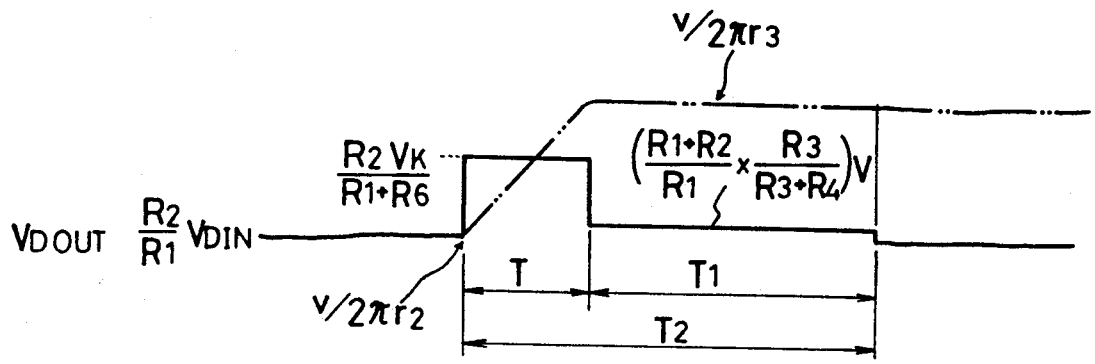
FIG. 11 is a timing graph of embodiment 2 in acceleration.
Figure 12:
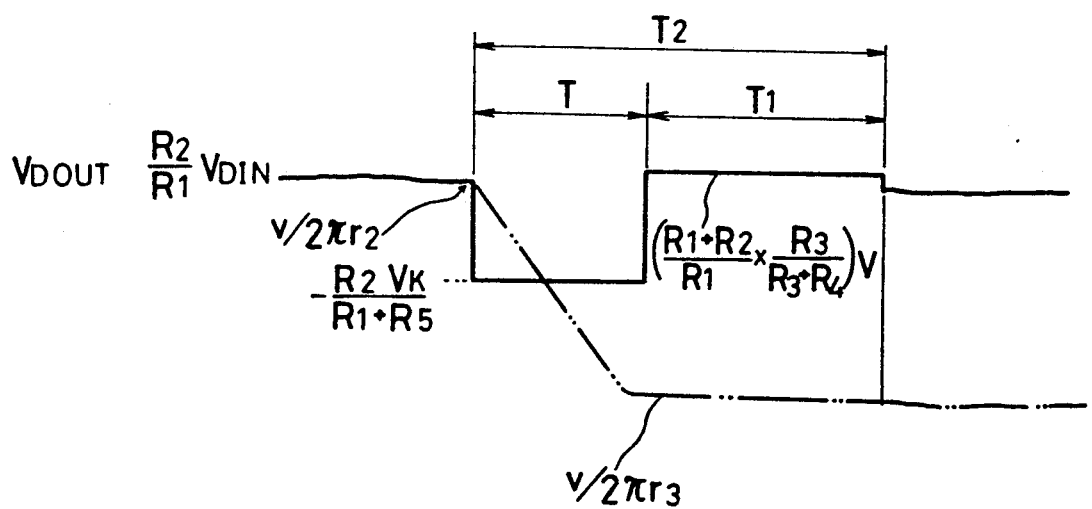
FIG. 12 is a timing graph of embodiment 2 in deceleration.

FIG. 11 is a timing graph showing the voltage variation during the acceleration process according to embodiment 2, and FIG. 12 is second timing graph showing the voltage variation during the deceleration process. In FIG. 11, the disc 2 is accelerated during the time T and rotates at a constant speed throughout time $T_1$. The rotation speed after the acceleration is maintained at $v/2\pi r_3$, as indicated by a double-dotted broken line. In FIG. 12, the disc 2 is decelerated during the time T and then rotates at a constant speed throughout time $T_1$. The rotation speed after deceleration is maintained at $v/2\pi r_3$, as also indicated by a double-dotted broken line.

EMBODIMENT 3

In the above embodiments, the deceleration control is carried out first before the free-run control or the constant-run control when the search is performed in the inward direction along the disc 2. However, the deceleration control may be carried out just before the optical pickup 5 arrives at a desired track, whereby the optical pickup 5, when moving at high speed, is less likely to fail to count tracks.

The organization and operation of embodiment 3 is different from embodiment 1 only in the control processes of the search operation. A flow chart of the search-processes control according to embodiment 3 is shown in FIG. 13.

Figure 13:
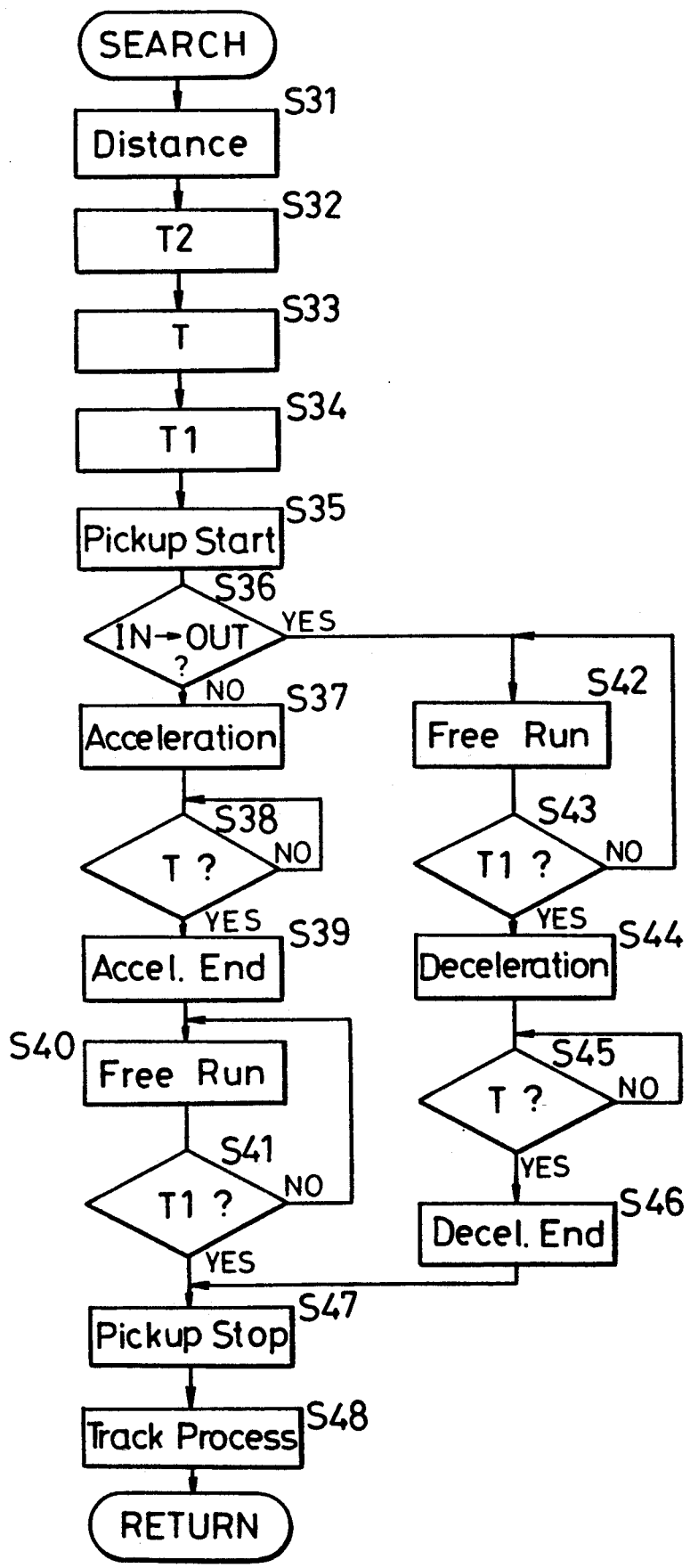
FIG. 13 is a flow chart showing a search process according to embodiment 3.

Referring to FIG. 13, the processes other than those of steps S42 to S46 are the same as in the above embodiments. When the optical pickup 5 moves outwardly in accordance with the determination at step S36, step S42 is executed, at which the process of free-run control is carried out. In the process, each of the switches 31, 32 and 33 are opened so as not to apply voltage to the spindle motor 4. At step S43, it is determined if the free-run control has been continued through time $T_1$. Until the time $T_1$ has elapsed, the free-run control is continued at step S42. Then, after the elapse of time $T_1$, the program proceeds to step S44.

At step S44, deceleration of the disc 2 is begun, in which only switch 32 is closed in order to apply the following voltage $V_{DOUT}$ to the spindle motor 4 during the time T.

$$V_{DOUT} = [R_2/(R_1+R_5)] \times V_K$$

At step S45, it is decided whether the time T of deceleration has elapsed. After the elapse of time T, the program proceeds to step S46. A step S46, switch 32 is opened, halting the deceleration, and then step S47 is executed.

FIG. 14 is a timing graph showing kick-in time during deceleration. In the deceleration control process, the disc 2 is decelerated during time T following the duration through time $T_1$ of the free-run process. In other words, the disc 2 rotates at a high speed until the deceleration begins. Then, the rotation speed is decreased from $v/2\pi r_2$ to $v/2\pi r_3$, as indicated by a double-dotted broken line.

As described in the foregoing, the control process by which the disc 2 is decelerated during the time T, following the free-run of time $T_1$, extends high-speed rotation of the disc 2 until deceleration begins. This reduces the traversing angle $\theta$ (as shown in FIG. 3) made by the locus L of the spotting beam with the tracks, whereby the spotting beam more finely crosses the pits. Thus a lesser number of tracks fail to be counted.

Modifications (a) Although the deceleration for the time T depends on the kick-in time as calculated in the above embodiments, deceleration may be carried out in a manner dependent upon the track number count, instead the calculation of time T.

The distance in which the optical pickup 5 moves during time T becomes $V \times T$, where the movement velocity of the optical pickup 5 is V. The track number tn which the optical pickup 5 crosses is calculated therein by $$tn = V \times T/0.0016$$

Figure 15:
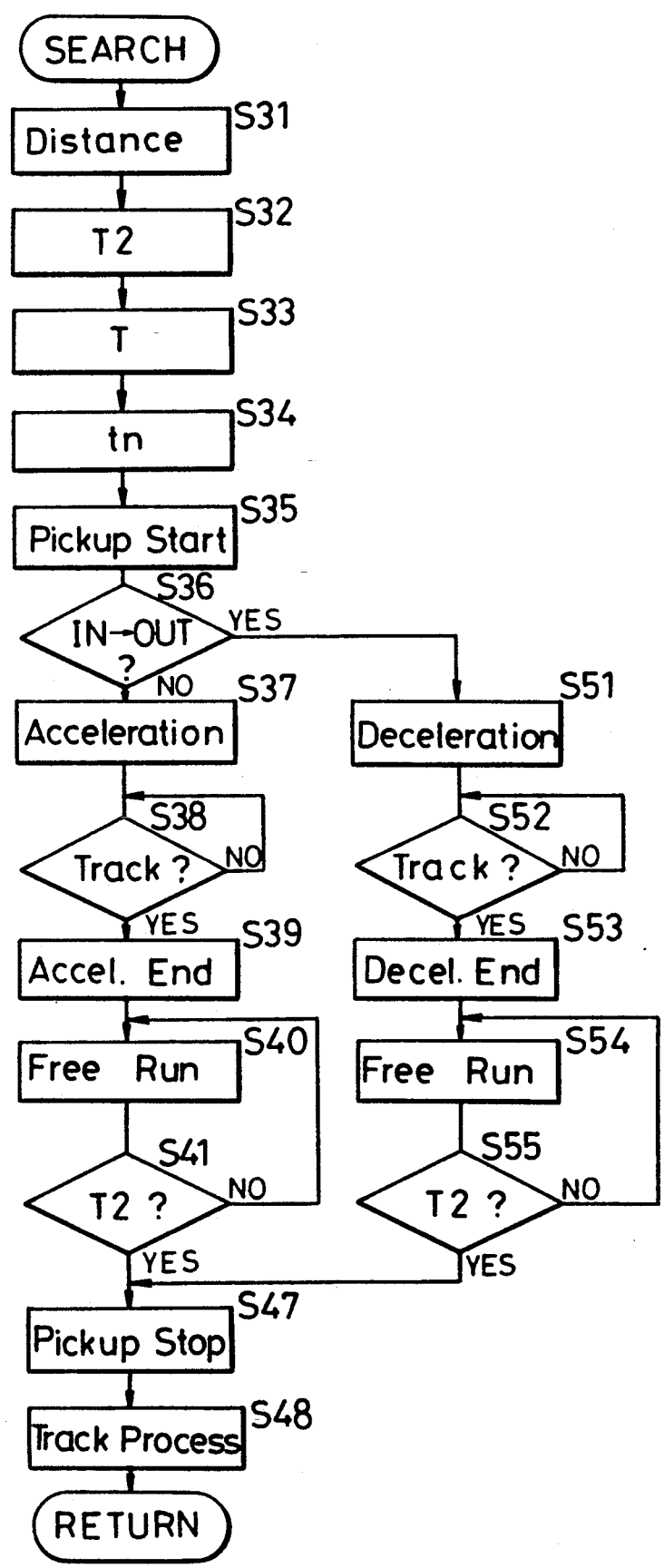
FIG. 15 is a flow chart showing a search process according to another embodiment.

Accordingly, step S34 in FIG. 15 may be modified so as to calculate the track number tn, and steps S38 and S53 may be modified so as to count the track number tn for determining whether the optical pickup 5 has crossed the number of tracks tn. That is, the acceleration/deceleration signals are outputted in the period which starts at the timing when the optical pickup 5 starts moving, and ends at the timing when the optical pickup 5 crosses the track of number tn. The acceleration/deceleration control is stopped when track counting ends.

(b) Instead of the control of embodiment 2 in which a small voltage is applied so as to drive the disc 2 to rotate at a constant speed in the constant-run condition, the kick-in time T may be set longer or shorter in correspondence with the rotational resistance when the kick-in time T is calculated at step S33 in FIG. 6 of embodiment 1, thus enabling accurate rotational speed of the optical disc 2. In this manner, the kick-in time T is extended in correspondence with the rotational resistance during acceleration, whereas it is shortened in correspondence with the rotational resistance during deceleration. Thereby, accurate rotation speed of the optical disc 2 is achieved at a desired track at which the optical pickup 5 is positioned, though without the application of small voltage, and the access time is yet reduced.

(c) In addition to its application to the CLV control, the present invention may be applied to a modified CLV control which performs a step-by-step alteration in linear velocity when the optical pickup 5 is moved in the outward direction.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A search operation control apparatus in an optical disc reader which searches a desired position along an optical disc having its information pits arranged in a segmental spiral, in response to a search command including information of said desired position, comprising:

means for reading said information pits translatable in the radial direction along said optical disc;

means for controllably moving said information reading means from a current position to a desired position when receiving said search command;

means for controllably moving said information reading means from a current position to a desired position when receiving said search command;

means for controllably rotating said optical disc to provide a rotation speed corresponding to said desired position using an acceleration/deceleration control process and a free-run control process while said movement controlling means controllably moves said information reading means;

said movement controlling means comprising means for calculating distance of said current position from said desired position; and means for calculating time interval during which said information reading means moves said distance;

said movement controlling means calculating said period of time by dividing said movement distance by the translation velocity of said information reading means along the radial direction; and said optical disc controlling means comprising means for calculating time for said acceleration/deceleration control process corresponding to the difference of the rotation numbers of said current position and said desired position; and means for calculating time for said free-run control process by substracting said acceleration/deceleration control process time from said time interval calculated by said movement controlling means.

2. An apparatus according to claim 1, wherein said optical disc controlling means decelerates said optical disc during said acceleration/deceleration control process time, and then allows said optical disc to run freely during said free-run control process time, when said search command is to search said desired position outward of said current position.

3. An apparatus according to claim 1, wherein said optical disc controlling means accelerates said optical disc during said acceleration/deceleration control process time, and then allows said optical disc to run freely during said free-run control process time, when said search command is to search a desired position inward of said current position.

4. An apparatus according to claim 1, wherein said optical disc controlling means further comprises a first switch to which a first power source is connected; a second switch to which a second power source having a polarity opposite to that of said first power source is connected; and an operational amplifier having the noninverting input terminal grounded, the inverting input terminal connected to said first and second switches, and the output terminal connected to said inverting input terminal.

5. An apparatus according to claim 4, wherein said optical disc controlling means closes said first switch in order to decelerate said optical disc during said acceleration/deceleration control process time, and then opens said first switch in order to allow said optical disc to run freely during said free-run control process time, when said search command is to search said desired position outward of said current position.

6. An apparatus according to claim 4, wherein said optical disc controlling means closes said second switch in order to accelerate said optical disc during said acceleration/deceleration control process time, and then opens said second switch in order to allow said optical disc to run freely during said free-run control process time, when said search command is to search said desired position inward of said current position.

7. An apparatus according to claim 1, wherein said optical disc controlling means comprises means for calculating time for said acceleration/deceleration control process corresponding to the difference of the rotational numbers for said current position and said desired position; means for calculating the number of tracks of said information pits crossed by said information reading means during said acceleration/deceleration control process time, depending upon said acceleration/deceleration control process time and the predetermined translation speed of said information reading means; means for counting said tracks crossed by said information reading means; and means for controlling the acceleration/deceleration of said optical disc until said number of tracks are tallied by said track counting means, and then directing said optical disc to run freely at the end of said time interval.

8. An apparatus according to claim 1, wherein said optical disc controlling means comprises means for calculating the time interval for said acceleration/deceleration control process time corresponding to the difference of the rotational numbers for said current position and said desired position, and a rotation number decreased by rotational resistance; means for calculating the time interval for said free-run control process time by subtracting said acceleration/deceleration control process time from said interval of time.

9. A search operation control apparatus in an optical disc reader which searches a desired position on an optical disc having its information pits arranged in a segmental spiral, in response to a search command including information of said desired position, comprising:

means for reading said information pits translatable in the radial direction along said optical disc;
means for controllably moving said information reading means from a current position to a desired position to a desired position when receiving said search command;
means for controllably rotating said optical disc to provide a rotation speed corresponding to said desired position using an acceleration/deceleration control process in order to make said optical disc rotate at said rotation speed corresponding to said desired position, and a constant-run control process in order to prevent decrease in said rotation speed of said optical disc due to rotational resistance while said movement controlling means controllably moves said information reading means;
said movement controlling means comprises means for calculating distance of said current position from said desired position; and means for calculating the time interval in which said information reading means moves said distance;
said movement controlling means calculating said time interval by dividing said movement distance by the translation velocity of said information reading means in the radial direction; and
said optical disc controlling means comprising means for calculating the time interval for said acceleration/deceleration control process, corresponding to the difference of the rotational numbers for said current position and said desired position; and means for calculating the time interval for said constant-run control process time by subtracting said acceleration/deceleration control process time from said time interval calculated by said movement controlling means.

10. An apparatus according to claim 9, wherein said optical disc controlling means decelerates said optical disc during said acceleration/deceleration control process time, and then directs said optical disc to maintain a constant-speed rotation during said constant-run control process time, when said search command is to search said desired position outward of said current position.

11. An apparatus according to claim 9, wherein said optical disc controlling means accelerates said optical disc during said acceleration/deceleration control process time, and then directs said optical disc to maintain constant-speed rotation during said constant-run control process time, when said search command is to search said desired position inward of said current position.

12. An apparatus according to claim 9, wherein said optical disc controlling means further comprises a first switch to which a first power sources is connected; a second switch to which a second power source having a polarity opposite to that of said first power source is connected; a third switch which is grounded; a fourth switch to which a third power source having the same polarity as that of said first power source; and an operational amplifier having its noninverting input terminal grounded through resistance and connected to said fourth switch, its inverting input terminal connected to said first, second and third switches, and the output terminal connected to said inverting input terminal.

13. An apparatus according to claim 12, wherein said optical disc controlling means closes said first switch to decelerate said optical disc during said acceleration/deceleration control time, and then opens said first switch and closes said third and fourth switches to maintain said optical disc at said constant-speed rotation, when said search command is to search said desired position outward of said current position.

14. An apparatus according to claim 12, wherein said optical disc controlling means closes said second switch in order to accelerate said optical disc during said acceleration/deceleration control time, and then opens said second switch and closes said third and fourth switches in order to maintain said optical disc at said constant-speed rotation, when said search command is to search said desired position inward of said current position.

15. An apparatus according to claim 9, wherein said optical disc controlling means comprises means for calculating the time interval for said acceleration/deceleration control process, corresponding to the difference of the rotational numbers for said current position and said desired position; means for calculating the number of tracks of said information pits crossed by said information reading means during said acceleration/deceleration control process time depending upon said acceleration/deceleration control process time and the predetermined translation speed of said information reading means; means for counting said tracks crossed by said information reading means; and means for controlling the acceleration/deceleration of said optical disc until said number of tracks are tallied by said track counting means, and then directing said optical disc to rotate at said constant speed at the end of said time interval.

16. A search operation control apparatus in an optical disc reader which searches a desired position along an optical disc having its information pits arranged in a segmental spiral, in response to a search command including information of said desired position, comprising:

means for reading said information pits translatable in the radial direction along said optical disc;

means for controllably moving said information reading means from a current position to a desired position when receiving said search command;

means for controlling said optical disc to decelerate immediately before said information reading means reaches said desired position, when receiving said search command to search in the outward direction along said optical disc;

said movement controlling means comprising means for calculating distance of said current position from said desired position;

means for calculating time interval in which said information reading means moves said distance;

said optical disc controlling means directing said optical disc by providing a free-run control process timing in which said optical disc freely runs, and a deceleration control process timing in which said optical disc is decelerated, in order to achieve the rotation speed corresponding to said desired position; and said optical disc controlling means comprising means for calculating said free-run control process time by subtracting said deceleration control process time from said time interval; and means for calculating time interval for said deceleration control process time corresponding to the difference of the rotational numbers for said current position and said desired position.

* * * * *